United States Patent
Carden

(10) Patent No.: US 7,186,288 B2
(45) Date of Patent: Mar. 6, 2007

(54) METHOD FOR FABRICATING HIGH PURITY, HIGH DENSITY METAL MATRIX COMPOSITE MATERIALS AND THE PRODUCT THEREOF

(76) Inventor: Robin A. Carden, 25677 Paseo De La Paz, San Juan Capistrano, CA (US) 92675

( * ) Notice: Subject to any disclaimer, the term of this patent is extended or adjusted under 35 U.S.C. 154(b) by 0 days.

(21) Appl. No.: 10/962,046

(22) Filed: Oct. 8, 2004

(65) Prior Publication Data
US 2005/0115359 A1    Jun. 2, 2005

Related U.S. Application Data

(62) Division of application No. 10/237,221, filed on Sep. 9, 2002, now Pat. No. 7,108,830.

(51) Int. Cl.
*B22F 3/12* (2006.01)
*B22F 3/24* (2006.01)
*C22C 32/00* (2006.01)

(52) U.S. Cl. .................... 75/232; 75/238; 75/245; 75/246; 75/249; 419/14; 419/20; 419/28

(58) Field of Classification Search .......... 75/232, 75/238, 245, 246, 249; 419/12, 14, 28
See application file for complete search history.

(56) References Cited

U.S. PATENT DOCUMENTS

| | | | | | |
|---|---|---|---|---|---|
| 4,699,849 | A | * | 10/1987 | Das | 428/698 |
| 5,330,704 | A | * | 7/1994 | Gilman | 419/60 |
| 5,561,829 | A | * | 10/1996 | Sawtell et al. | 419/13 |
| 5,700,962 | A | * | 12/1997 | Carden | 75/236 |
| 5,948,495 | A | * | 9/1999 | Stanish et al. | 428/64.1 |
| 6,630,100 | B1 | * | 10/2003 | Murakami et al. | 419/12 |

* cited by examiner

*Primary Examiner*—Ngoclan T. Mai
(74) *Attorney, Agent, or Firm*—Leonard Tachner

(57) ABSTRACT

A method of production of large Ingots of neutron attenuating composites using a vacuum-bellows system allows for large cross-sectional shapes to be extruded and rolled. This method uses a vacuum-bellows technology which allows the manufacturing of large 8–16 inch diameter ingots (50–450 lbs. each). A variety of primary metal matrix materials can be used in this technology. High specific strength and stiffness can be achieved because the technology allows for final densities of 99% and higher. The vacuum-bellows technology allows metals and ceramics to blend and mesh together at compression pressures of 800 tons with elevated temperatures. The controlled compression movement allows for any oxide layer, on the metal, to be broken up and consolidated with the chosen ceramic particulate.

6 Claims, 2 Drawing Sheets

METHOD FOR FABRICATING HIGH PURITY, HIGH DENSITY METAL MATRIX COMPOSITE MATERIALS AND THE PRODUCT THEREOF

CROSS-REFERENCE TO RELATED APPLICATIONS

This application is a divisional of U.S. patent application Ser. No. 10/237,221 filed Sep. 9, 2002 now U.S. Pat. No. 7,108,830 from which priority is claimed.

BACKGROUND OF THE INVENTION

1. Field of the Invention

The present invention relates generally to the field of metal matrix composite materials including those materials which have high, cross-sectional Barn values including ceramics, and metals including but not limited to boron, samarium and gadolinium oxides, nitrides, carbides and suicides thereof. These ceramic's and metal additives are used for attenuating neutrons in nuclear fuel. The invention relates more specifically to an apparatus and method for producing such materials with high strength, high density and durability and large ingot sizes.

2. Background Art

Most methods for producing metal matrix composites use liquid mixing and dry powder Iso-pressing technology. Liquid mixing is very limited in regard to the size and type of particulates, which can be stirred or mixed into the molten melt. Harmful metal-ceramic reactions, which occur at elevated temperatures during the melt, limited percentages of ceramic particulate additive and low specific strength and stiffness are all problems associated with, molten stir fabrication of metal matrix composites. Iso-pressed metal matrix composites show good specific strength and stiffness but have a problem with the ingot production size. This problem is associated with available Iso-press equipment. The maximum inner diameter of the largest manufactured high pressure Iso-press is approximately 12 inches. Because of consolidation shrinkage and latex bag tooling, the largest ingot diameter that could be produced is approximately 8 inches. Low green density areas are also evident in the center area of the Iso-pressed 8-inch metal matrix ingots. These present processing problems and reduce physical strength properties of the composite. Because of such size limitations, large cross-sectional extrusions cannot be made and high extrusion ratios, which are a key to producing good physical properties, cannot be accomplished.

SUMMARY OF THE INVENTION

The present invention comprises a method of producing large ingots of boron-rich metal matrix composite materials as well as the apparatus used in that process and the resulting product.

This method uses a vacuum-bellows technology, which allows the manufacturing of large 8–16 inch diameter ingots (50–450 lbs. each). A variety of primary metal matrix materials can be used in this technology. High specific strength and stiffness can be achieved because the technology allows for final densities of 99% and higher. The vacuum-bellows technology allows metals and ceramics to blend and mesh together at compression pressures of 800 tons with elevated temperatures. The controlled compression movement allows for any oxide layer, on the metal, to be broken up and consolidated with the chosen ceramic particulate. One application is to blend boron-rich ceramics and high purity (99.5–99.99%) Aluminum particulates together and produce a large ingot using this vacuum-bellows technology. The vacuum-bellows technology allows the ingot to be extruded to large cross-sectional sizes that some applications need (9–12 width). By controlling the amount of boron-rich ceramics, by volume or weight, certain B-10 isotope areal densities can be accomplished. These B-10 isotopes attenuate neutrons in nuclear fuel. Other elements which have high, cross-sectional Barn values can be used. These are, but not limited to, samarium and gadolinium oxides, nitrides, carbides and silicides. Other applications involve large cross-sectional extrusions which are produced in a variety of different metal-ceramic composites to improve structural properties, such as in sailing masts, building structures, robotic arms, automotive and aerospace applications.

It will be seen hereinafter that the novel process disclosed herein provides an essentially new metal matrix material exhibiting higher final densities and better physical strength properties. This new metal matrix material is not readily achievable using prior art methods of fabrication that require certain chelating additives which reduce achievable densities and physical strength and durability properties. Moreover, the disclosed process makes possible the production of larger size ingots, which are especially advantageous for use in neutron attenuation applications as well as numerous other applications. A preferred embodiment of the novel process comprises the steps of:

1. Preparing the powder mixture;
2. Compacting the powder mixture;
3. Outgassing and sintering the mixture;
4. Vacuum pressing the mixture;
5. Cooling the resulting billet and machining as desired; and
6. Checking billet density and, if necessary repeating steps 2 through 5 as required achieving desired density.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

Figure 1:
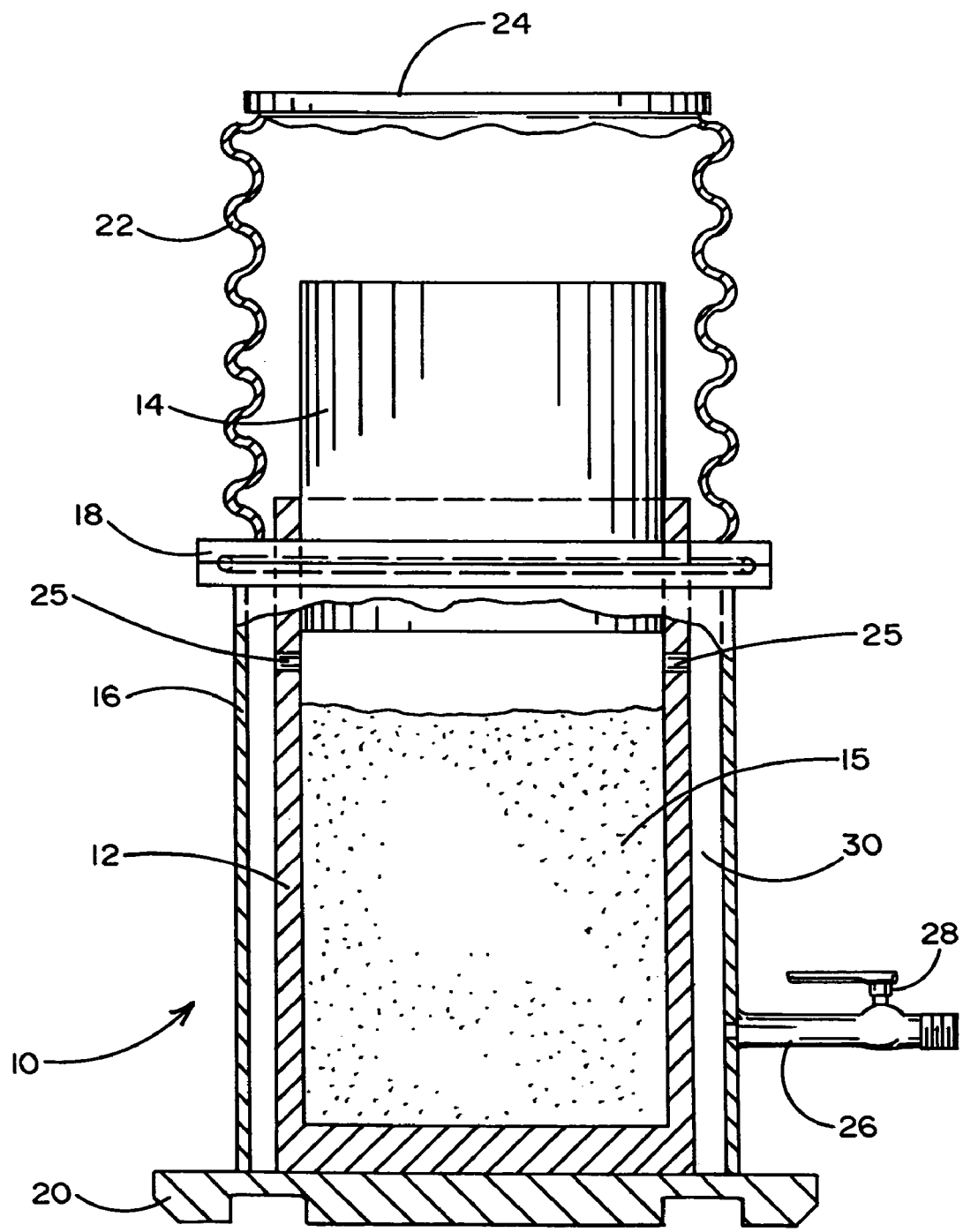
FIG. 1 is a partially cross-sectioned view of an apparatus which may be employed in carrying out a preferred embodiment of the inventive process of the invention, wherein the apparatus is shown in its pre-compression configuration.
Figure 2:
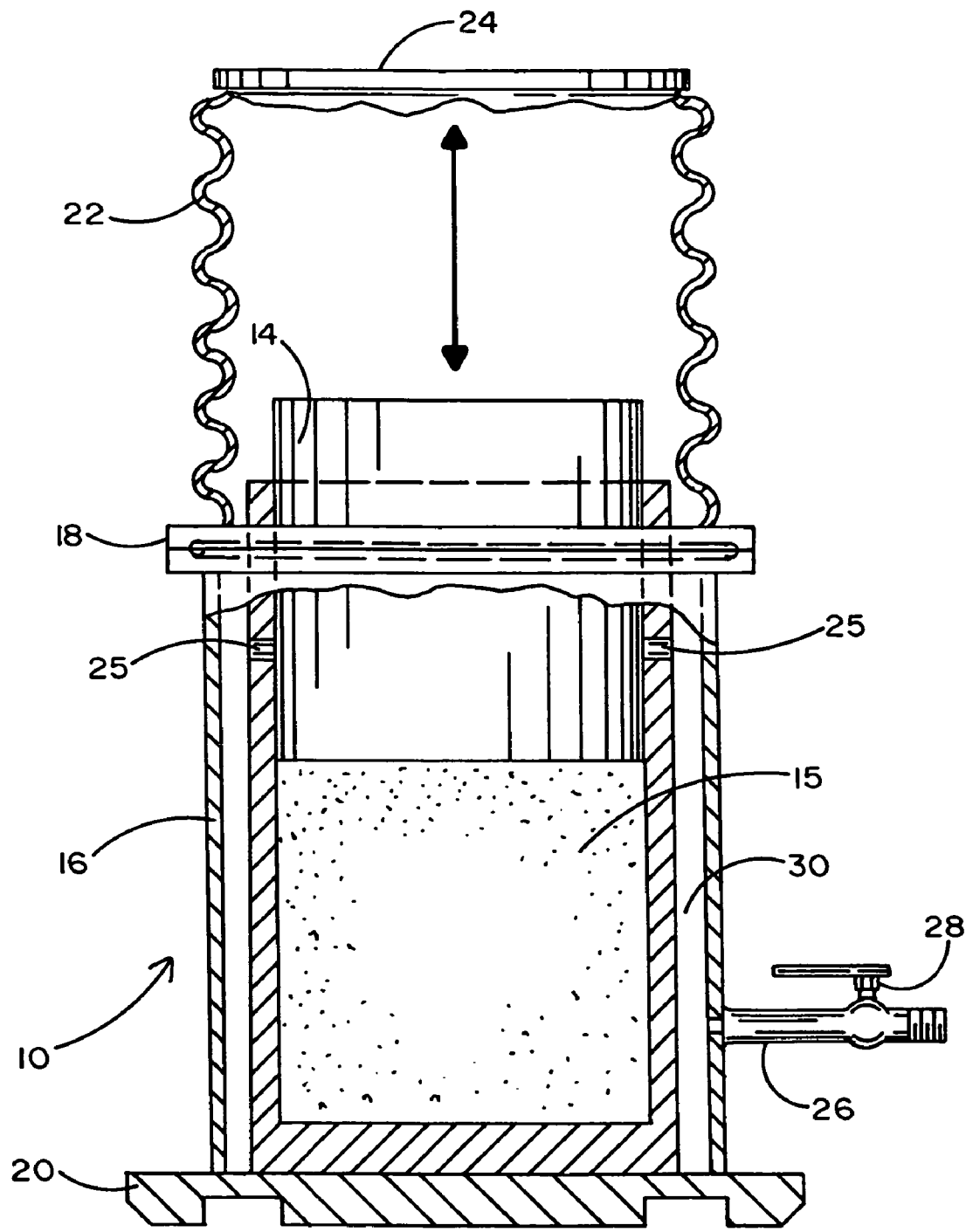
FIG. 2 is a view of the apparatus of FIG. 1, but showing the apparatus in its powder compression configuration.

A preferred apparatus 10 of the invention is shown in FIGS. 1 and 2. It is uniquely configured to permit vacuum pressing of large billets of the neutron-attenuating metal-ceramic composite material of the present invention. Apparatus 10 comprises die 12 having a die punch 14. The die is contained in an outer housing 16 having a base 20. Controlled compression of the die punch 14 is obtained by means of a bellows 22 having a pressure plate 24 and being secured to the die 12 by a vacuum tight ring seal 18. Die 12 has a plurality of degassing ports 25 which exit into a chamber 30 formed around the die within outer housing 16. A degassing outlet pipe 26 is the only exit point for gases within chamber 30. A vacuum valve 28 determines whether outlet pipe 26 is open to ambient or closed. After a powder mixture has been prepared as will be disclosed hereinafter, the mixture 15 is loaded into die 12 as shown in FIG. 1. Force is then applied by means of a press (not shown) to pressure plate 24 compressing bellows 22 and forcing die punch 14 into die 12. During the application of pressure to the material 15, the material outgasses. The gases are routed through ports 25 into chamber 30 and though outlet 26 with vacuum valve 28 in its open state. These steps are repeated after adding more powder mixture to the die until the die is substantially full and all of the mixture has been compacted and outgasses to a partial extent.

The die is then placed in a retort of appropriate size and the retort is connected to a vacuum pump to substantially remove all remaining gases. The valve 28 is then closed and the die is then placed in an oven for sintering at a selected temperature for a selected period of time (i.e., 800° F. for 6 hours). Further evacuation and heating may then be repeated as required to achieve a desired characteristic. Upon completion of sintering and oven and further pressure is applied to the sintered material, with vacuum still maintained, i.e. up to 800 tons for a 14 inch diameter billet. The vacuum is then released and the billet is then allowed to cool before being removed from the die. After removal from the die, the billet density is ascertained and, if necessary, the process is repeated until the desired density is reached.

An important feature of the apparatus 10 is the provision of an outgassing path that may selectively be opened or closed during the process of the invention. This feature permits powder compaction before sintering and vacuum pressing at high temperature without permitting formation of metal oxides in the powder mixture and resulting billet. By avoiding the formation of metal oxides, such as $Al_2O_3$, powder compaction can be very effective and sintering and vacuum pressing can achieve densities over 99% of theoretical without requiring chelating agents of the prior art.

In a preferred embodiment, the initial powder mixtures comprises 5–40% wt of boron carbide and 60–95% wt of aluminum, magnesium, titanium, gadolinium, steel and the like. No chelating additives are used. The initial powder mixture has a grain size of 3–200 μm achieved by use of a mesh screen to remove larger material. Thus, the metal matrix comprises a metal selected from the group consisting of aluminum, gadolinium, titanium, steel and magnesium.

In the apparatus 10, the bellows 22 is preferably made of Inconel to withstand pressure and high temperature and outer housing 16 is preferably made of high temperature steel for the same reason. The maximum compaction force for a 14 inch diameter billet is 800 tons and maximum pressure for that same size billet during vacuum pressing is also 800 tons at 10,000 psi. The maximum sintering temperature is 850° F. and the sintering retort vacuum maximum is 400 microns.

Having thus disclosed a preferred embodiment of the present invention, it will be understood that numerous additions and modifications are contemplated and may occur to those who have the benefit of the teaching herein. Accordingly, the scope hereof is to be limited only by the appended claims and their equivalent.

I claim:

1. An ingot of ceramic-metal matrix material having a diameter of at least eight inches and having a density of at least 99% of maximum theoretical density wherein said ceramic comprises boron carbide, gadolinium oxide or samarium oxide.

2. The ingot recited in claim 1 wherein said boron carbide, gadolinium oxide or samarium oxide comprises from 25% to 35% by weight of said ceramic-metal matrix material.

3. The ingot recited in claim 1 wherein said metal matrix comprises a metal selected from the group consisting of aluminum, gadolinium, titanium, steel and magnesium.

4. An ingot of ceramic-metal matrix material having a diameter of at least eight inches and fabricated by a method comprising the steps of:
   preparing a blended powder mixture of a selected ceramic selected from the group consisting of boron carbide, gadolinium oxide and samarium oxide and a selected metal matrix material;
   compacting said mixture;
   outgassing and sintering said compacted mixture at a selected temperature for a selected period of time;
   vacuum pressing the sintered mixture until a billet is formed, said billet having a minimum density of 99% of theoretical maximum density; and
   cooling said billet.

5. The ingot recited in claim 4 wherein said boron carbide, gadolinium oxide or samarium oxide comprises from 25% to 35% by weight of said ceramic-metal matrix material.

6. The ingot recited in claim 4 wherein said metal matrix comprises a metal selected from the group consisting of aluminum, gadolinium, titanium and magnesium.

* * * * *